United States Patent
Bonnet et al.

(10) Patent No.: US 8,501,862 B2
(45) Date of Patent: Aug. 6, 2013

(54) EXTRUSION AGENT BASED ON A HETEROGENEOUS PVDF

(75) Inventors: Anthony Bonnet, Beaumont le Roger (FR); Johann Laffargue, Bernay (FR); Francois Beaume, Bernay (FR)

(73) Assignee: Arkema France, Colombes (FR)

( * ) Notice: Subject to any disclaimer, the term of this patent is extended or adjusted under 35 U.S.C. 154(b) by 752 days.

(21) Appl. No.: 12/160,493

(22) PCT Filed: Jan. 5, 2007

(86) PCT No.: PCT/FR2007/050612
§ 371 (c)(1),
(2), (4) Date: Jul. 30, 2010

(87) PCT Pub. No.: WO2007/080338
PCT Pub. Date: Jul. 19, 2007

(65) Prior Publication Data
US 2010/0298487 A1    Nov. 25, 2010

Related U.S. Application Data

(60) Provisional application No. 60/793,987, filed on Apr. 21, 2006.

(30) Foreign Application Priority Data

Jan. 13, 2006 (FR) ..................................... 06 00297

(51) Int. Cl.
*C08L 27/16* (2006.01)
*C08L 83/06* (2006.01)

(52) U.S. Cl.
USPC ............. 524/520; 525/199; 525/55; 525/104; 525/190; 525/185; 525/186

(58) Field of Classification Search
USPC .................... 524/520; 525/199, 55, 104, 190, 525/185, 186
See application file for complete search history.

(56) References Cited

U.S. PATENT DOCUMENTS

2004/0167282 A1 *   8/2004   Pascal et al. .................. 525/109

* cited by examiner

*Primary Examiner* — Robert D. Harlan
(74) *Attorney, Agent, or Firm* — Thomas F. Roland

(57) ABSTRACT

The invention relates to an extrusion agent comprising: at least one heterogeneous PVDF (A), in other words a copolymer of VDF and at least one comonomer of VDF, comprising by weight at least 50%, advantageously at least 75%, of VDF which has a melting point Tm (expressed in ° C.)>172-549 m, preferably >1.1×(172-549 m), where m denotes the overall molar percentage of comonomer(s); and at least one interface agent (B), which are optionally diluted in a polyolefin (C). The heterogeneous PVDF preferably has a Tm of between 160 and 172° C. Advantageously it is also a VDF-HFP copolymer containing, by weight, from 88% to 92% of VDF and from 8% to 12% of HFP. The extrusion agent is used to reduce or eliminate the surface defects which arise during the extrusion of a thermoplastic resin (D). This resin may be a polyolefin, a styrenic resin, a polyester or a PVC. Optionally it may also be filled, i.e., may contain dispersed organic or inorganic particles.

17 Claims, 2 Drawing Sheets

EXTRUSION AGENT BASED ON A HETEROGENEOUS PVDF

FIELD OF THE INVENTION

Figure 1:
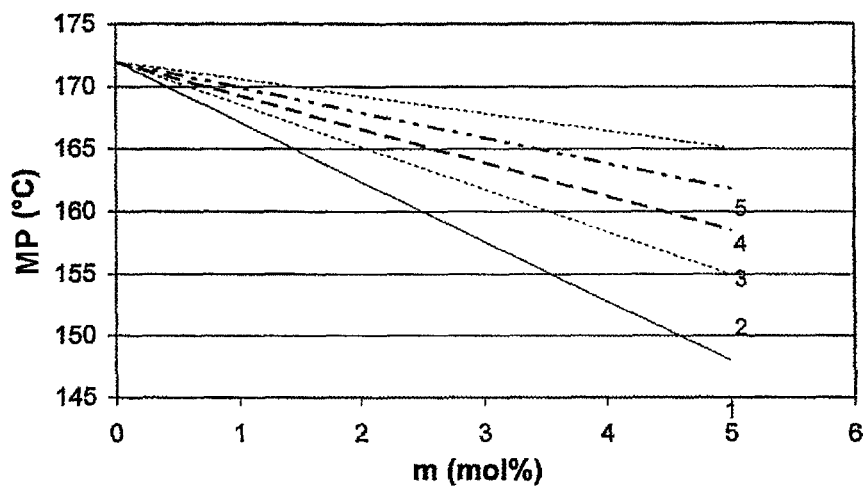

The present invention relates to a processing aid, that is to say an additive which makes it possible to reduce or eliminate the surface defects which appear when a thermoplastic resin is extruded. The processing aid comprises at least one heterogeneous PVDF (A) and at least one interfacial agent (B), which are optionally diluted in a polyolefin (C).

TECHNICAL PROBLEM

During the extrusion of thermoplastic resins, in particular polyolefins, especially in the form of films, flow irregularities may appear at the outlet of the extruder die leading to surface defects and sometimes impairment of the mechanical and/or optical properties. This phenomenon appears especially when a critical shear rate is exceeded. Below the critical rate, the extrudants are smooth, whereas above this rate surface defects are observed. These defects, that are referred to as "melt fracture" exist in several forms. At a shear rate slightly above the critical rate, the films obtained by extrusion-blow molding lose their transparency and their gloss. For substantially higher rates (that is to say at higher production outputs) homogeneity defects appear with smooth zones in a rough surface. These defects significantly reduce the optical and/or mechanical properties of the film. The same phenomena may be observed on extruded rods. When the surface of the rods loses its gloss and becomes matt and rough, it is often compared to "orange peel".

A mineral or organic filler is often added to a thermoplastic resin. For example, silica may be used as an anti-blocking agent, and carbon black or mineral pigments are used to dye the resin. However, the addition of a filler has a tendency to promote the appearance of surface defects. In this case, the processing aids proposed in the prior art are not very effective, that is to say that they do not make it possible to significantly reduce the extrusion defects or else it is necessary to add them in a larger amount than the processing aid described in the present application.

PRIOR ART

In U.S. Pat. No. 3,334,157, the incorporation of polytetrafluoroethylene improves the optical properties of a polyethylene film.

In US 2003/0236357, a fluoropolymer is used as a processing aid in combination with an interfacial agent.

According to U.S. Pat. No. 4,855,360, U.S. Pat. No. 5,587,429, WO 00/44829 and WO 02/066544 a fluoroelastomer in combination with a polyoxyalkylene (polyoxyethylene glycol also denoted by PEG) is used to improve the conversion of hydrocarbon-based polymers.

In U.S. Pat. No. 5,015,693, the PEG and the fluoropolymer may be blended using an extruder or a Banbury mixer, both being in the melt stage before being introduced into the material to be extruded.

Organophosphates or organophosphites in combination with a fluoroelastomer have been described in U.S. Pat. No. 4,983,677 and U.S. Pat. No. 4,863,983 for also improving the conversion of hydrocarbon-based polymers.

None of these documents mentions a heterogeneous PVDF.

It has now been discovered that the blend of a heterogeneous PVDF and an interfacial agent results in a more effective processing aid than the processing aids already described or sold.

FIGURES

FIG. 1/3 corresponds to a graph on which the melting point of the PVDF (in ° C.) is plotted as a function of the comonomer content, expressed as mol % and denoted by m. The straight line 1 corresponds to homogeneous PVDFs. The straight lines 2, 3, 4 and 5 correspond respectively to the relationships 172-340 m, 172-269 m, 172-203 m and 172-138 m which are explained later on in the definition of the heterogeneous PVDF.

Figure 2:
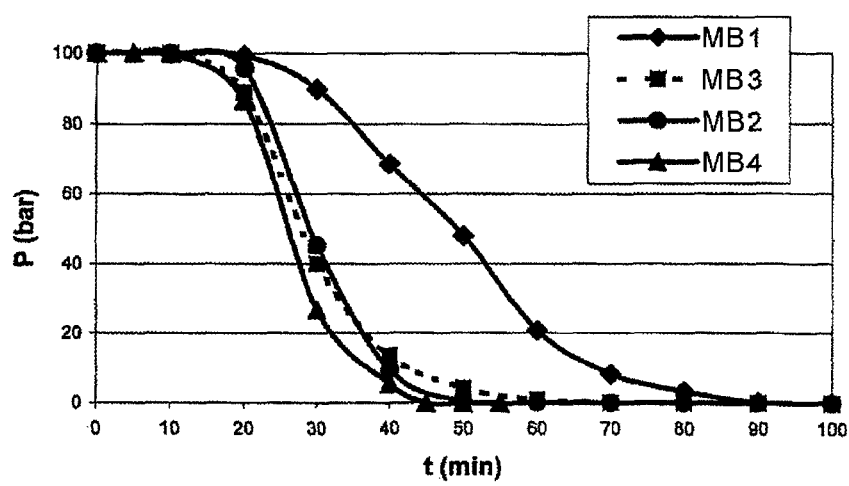

FIG. 2/3 illustrates the results obtained with various processing aids recorded as MB-1 to MB-4. It represents the pressure recorded at the dye outlet as a function of the extrusion time.

Figure 3:
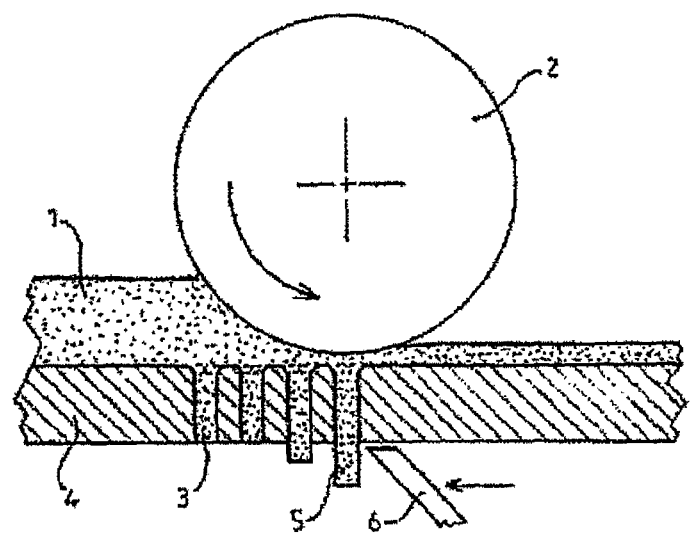

FIG. 3/3 illustrates the operation of a granulator. The product or the blend of products to be granulated forms a layer 1 which is constantly crushed by the rotating roller 2, that is to say precompressed and pressed into the compression channels 3 of the perforated dye 4. A cylindrical granule 5 then exits from beneath the die 4. A cutting device 6, located underneath the die 4, makes it possible to obtain granules with the desired length.

BRIEF DESCRIPTION OF THE INVENTION

The invention relates to a processing aid comprising:
- at least one heterogeneous PVDF (A), that is to say a copolymer of VDF and of at least one comonomer of VDF comprising at least 50 wt %, advantageously at least 75 wt %, of VDF which has a melting point MP (expressed in ° C.)>172-549 m, preferably >1.1×(172-549 m) where m denotes the overall molar percentage of comonomer(s); and
- at least one interfacial agent (B),
- optionally diluted in a polyolefin (C).

Preferably, the heterogeneous PVDF has an MP between 160 and 172° C. It is also advantageously a VDF-HFP copolymer comprising from 88 to 92 wt % of VDF and from 8 to 12 wt % of HFP.

The processing aid is used to reduce or eliminate the surface defects which appear during extrusion of a thermoplastic resin (D). This may be a polyolefin, a styrene resin, a polyester or a PVC. It may also optionally be filled, that is to say contain dispersed organic or mineral particles.

The invention will be better understood on reading the detailed description which follows, non-limiting exemplary embodiments of the latter and on examining the appended figures. The prior applications FR 06/00297 and U.S. 60/793,987 for which the priority is claimed are incorporated by reference into the present application.

DETAILED DESCRIPTION OF THE INVENTION

The term "PVDF" denotes a polymer comprising at least 50 wt %, advantageously at least 75 wt %, of vinylidene fluoride VDF ($CH_2=CF_2$).

The term "heterogeneous PVDF" denotes a copolymer of VDF and of at least one comonomer of VDF (copolymerizable with the VDF) which is characterized by the fact that the polymer chains have an average comonomer content distribution which is multimodal or spread out. The term "multimodal" is not to be understood as in document U.S. Pat. No.

6,277,919 which refers to a fluoropolymer characterized by fractions having various molecular weights. The heterogeneous PVDF comprises from 0.1 to 25%, advantageously from 1 to 20%, preferably from 1 to 15%, more preferably still from 5 to 15% of at least one comonomer per 75 to 99.9%, advantageously 80 to 99%, preferably 85 to 99%, more preferably still 85 to 95% respectively of VDF.

The comonomer may be vinyl fluoride, trifluoroethylene (VF3), chlorotrifluoroethylene (CTFE), 1,2-difluoroethylene, tetrafluoroethylene (TFE), hexafluoropropylene (HFP) and perfluoro(alkyl vinyl)ethers. Besides the comonomers cited, the heterogeneous PVDF may also comprise a non-fluoro monomer such as an olefin, for example ethylene or propylene. The comonomer is advantageously HFP or CTFE. Preferably, the PVDF comprises, as monomers, only VDF and HFP or VDF and CTFE and also advantageously no TFE.

The heterogeneous PVDF comprises polymer chains that are rich in comonomer and chains comprising almost none or little comonomer. This particular distribution of the comonomer distinguishes the heterogeneous PVDF from a PVDF known as a homogeneous PVDF, for which the polymer chains have a narrower average content distribution (U.S. Pat. No. 2,752,331 describes, for example, a means for obtaining a homogeneous VDF-CTFE copolymer). This particular distribution of the comonomer has an influence on the crystallinity and on the melting point MP of the PVDF. The heterogeneous PVDF has a melting point MP that is generally between 160 and 172° C. Compared to a homogeneous PVDF, the MP of the heterogeneous PVDF is higher. In other words:

MP (homogeneous PVDF)<MP (heterogeneous PVDF)<172° C. (PVDF homopolymer)

preferably, the MP is at least 10% different, that is to say that:

MP (homogeneous PVDF)×1.1<MP (heterogeneous PVDF)<172° C. (PVDF homopolymer)

It is furthermore possible to define the MP of a homogeneous PVDF by a simple mathematical equation linked to the overall molar percentage of comonomer(s):

MP (homogeneous PVDF) in ° C.=172-549 m

The more heterogeneous the PVDF is, the further its MP is from that of a homogeneous PVDF. More specifically, the following will therefore be preferred: heterogeneous PVDFs having an MP between (172-340 m) and 172° C., rather between (172-269 m) and 172° C., advantageously between (172-203 m) and 172° C., even more advantageously between (172-138 m) and 172° C. where m denotes the overall molar percentage of comonomer(s). In FIG. 1/3, the heterogeneous PVDFs therefore lie above the straight line 2, rather above the straight line 3, advantageously above the straight line 4, even more advantageously above the straight line 5.

Example

A homogeneous PVDF comprising 90 wt % of VDF and 10 wt % of HFP (4.53 mol %) has an MP of 147° C. A heterogeneous copolymer having the same overall content of HFP has an MP (determined by DSC, ASTM D3418) between 156.6 and 172° C., rather between 159.8 and 172° C., advantageously between 162.8 and 172° C., even more advantageously between 165.7 and 172° C. A homogeneous copolymer which comprises the same overall content of HFP will have an MP of around 148° C.

One preferred heterogeneous PVDF is a VDF-HFP copolymer comprising from 88 to 92 wt % of VDF and from 8 to 12 wt % of HFP having an MP between 160 and 172° C., such as for example PVDF-1 (see the examples section).

The heterogeneous PVDF is prepared by polymerization in a disperse aqueous medium (emulsion or suspension). The aqueous emulsion polymerization is carried out in the presence of at least one surfactant (emulsifier) chosen from the usual surfactants. For example this may be $C_6F_{13}C_2H_4SO_3K$ or the surfactants disclosed in U.S. Pat. No. 2,559,752 or in U.S. Pat. No. 3,311,566. The aqueous suspension polymerization is carried out in the presence of a dispersing agent chosen from the usual agents, for example a polyvinyl alcohol or a water-soluble cellulose ether (for example, methyl celluloses, or methyl hydroxypropyl celluloses).

The polymerization is initiated by at least one water-soluble or organic radical initiator. It can, for example, be a peroxide (for example di(tert-butyl) peroxide), a dialkyl peroxydicarbonate (for example n-propyl peroxydicarbonate or isopropyl peroxydicarbonate) or a persulphate. For each stage of the polymerization, the initiator can be employed completely at the start or by successive portions or else introduced continuously. The amount of initiator is generally between 0.02 and 3 wt %, with respect to the monomers introduced.

The molecular weights can optionally be controlled by at least one transfer agent. This can, for example, be a ketone (for example acetone), an aldehyde, an alcohol (for example tert-butanol or isopropyl alcohol) or an olefin. The amount of transfer agent is generally between 0.1 and 5 wt %, with respect to the monomers introduced. For each stage of the polymerization (such as, for example, for the stages of the two preparation methods which are given below), the optional transfer agent can be employed completely at the start or by successive portions or else introduced continuously.

The polymerization is generally carried out between 50 and 130° C. under a pressure between 30 and 200 bar.

Various possible methods for the preparation of a heterogeneous PVDF are given. According to a 1st method, it is possible:

in a 1st stage, to polymerize the VDF and the comonomer, then in a 2nd stage, after having converted between 10 and 60%, to introduce and to polymerize only VDF.

During the 1st stage, all the VDF can be introduced at the start but it may be preferable to introduce only a portion of the charge, the remainder being added gradually during the copolymerization so as to maintain a constant pressure in the reactor. The comonomer is introduced all at once or gradually, depending on its reactivity with the VDF. During the 2nd stage, the polymerization is continued with VDF only. Examples are given in Application EP 0 280 591 A1.

Example 1 Illustrating the 1st Method

VDF/$C_2F_3Cl$ Heterogeneous Copolymer (12 wt % $C_2F_3Cl$)

40 liters of deionized water, 40 g of emulsifier of formula $C_6F_{13}C_2H_4SO_3K$, 4 g of sodium pyrophosphate, 4 g of potassium persulfate and 500 g of a paraffin wax melting between 54 and 56° C. are introduced into a 60-liter autoclave. The temperature is adjusted to 80° C., the reactor is purged under vacuum, 50 g of acetone and 600 g of $C_2F_3Cl$ are introduced and a VDF pressure of 90 bar is admitted. When the fall in pressure reaches 3 bar, VDF is steadily introduced in order to keep the pressure at 90 bar. The $C_2F_3Cl$ is then introduced in a proportion of 0.3 g of $C_2F_3Cl$ per gram of VDF which is introduced to keep the pressure at 90 bar. After 5.46 kg of VDF and 1.64 kg of $C_2F_3Cl$, the $C_2F_3Cl$ feed is cut off and 400 g of acetone and 1 g of potassium persulfate are added, followed by 6.82 kg of VDF at a rate which makes it possible to keep the pressure at 90 bar. The rate of introduction of the VDF is of the order of 3 kg/h during and after the addition of $C_2F_3Cl$. The reactor is degassed and a latex with a solids content of 33%, with a heterogeneous composition by microscopy, comprising an overall level of $C_2F_3Cl$ of 12 wt %, is recovered.

According to a 2nd method, it is possible:
in a 1st stage, to introduce into the reactor and to polymerize a 1st charge of VDF, then
in a 2nd stage, after having obtained a degree of conversion to the polymer, advantageously of between 50 and 90%, preferably between 70 and 80%, to introduce the comonomer and the VDF. The comonomer can be introduced either all at once or gradually.

The rate of introduction of the comonomer depends on the moment of introduction. For example, in the case where the comonomer, in particular HFP, is introduced after a conversion of greater than 80%, the comonomer has to be introduced rapidly, that is to say all at once. Conversely, when the comonomer, in particular HFP, is introduced for a conversion of between 50 and 80%, the comonomer can be introduced rapidly or gradually. Examples are given in EP 0 456 019 A1.

Example 1 Illustrating the 2nd Method

VDF/HFP Heterogeneous Copolymer (10 wt % of HFP)

206 kg of deionized water, 100 g of ammonium perfluorodecanoate and 12 g of paraffin wax are charged to a 400-liter reactor. The temperature is raised to 90° C. and 9 kg of VDF and 3 kg of trichlorofluoromethane (TCFM) are charged. When the temperature has stabilized, 0.45 kg of isopropyl peroxydicarbonate is injected in the form of an emulsion comprising 1 wt % of IPP in water comprising 0.15% of ammonium perfluorodecanoate. The initiator is then gradually injected so as to maintain the polymerization of the VDF at a rate of the order of 27 kg/hour. When approximately 61 kg of VDF have been introduced and polymerized, i.e. approximately 75% of the total VDF, 9 kg of HFP are introduced continuously at a rate of 45 kg/hour and VDF is also introduced continuously. More IPP is injected in order to promote the copolymerization. The reaction is continued until 82 kg of VDF have been introduced. The heterogeneous PVDF has a viscosity of 1.4 kP (230° C., 100 s$^{-1}$) and a melting point of 163-168° C.

Example 2 Illustrating the 2nd Method

VDF/HFP Heterogeneous Copolymer (10 wt % of HFP)

The conditions of the preceding Example 1 are repeated but in the presence of 1.4 kg of TCFM and an initial content of IPP of 0.05 wt %, with respect to the initial VDF charge. The heterogeneous PVDF has a viscosity of 15.4 kP (230° C., 100 s$^{-1}$) and a melting point of 163-168° C.

Example 3 Illustrating the 2nd Method

VDF/HFP Heterogeneous Copolymer (10 wt % of HFP)

The conditions of Example 1 are repeated but while adjusting the TCFM content in order to obtain a heterogeneous PVDF having a viscosity of 2350 Pas (230° C., 100 s$^{-1}$) and a melting point of 166° C.

The 2nd method can be used with advantage for VDF/HFP heterogeneous copolymers having an overall HFP content of between 5 and 15 wt %.

According to a 3rd method, a charge comprising the VDF and the comonomer is introduced all at once into the reactor and polymerized, and then the copolymerization is allowed to continue until complete. All the monomers are thus introduced all at once at the beginning of the polymerization. Examples are given in EP 0 552 931 B1. Thus, a PVDF according to this patent is disclosed as being composed of elastomeric nodules of heterogeneous copolymer of VDF and of comonomer(s) representing more than 55 wt % of the PVDF dispersed in a continuous crystalline phase of VDF quasipolymer representing at least 10 wt % of the PVDF. The term "elastomeric nodules" denotes the fraction of the PVDF extracted by steeping a microtome section with a thickness of 0.1 μm in methyl ethyl ketone at ambient temperature for 16 hours. This fraction, which constitutes the elastomeric phase, comprises virtually all the comonomer(s) of the PVDF. The size of the nodules is between 0.05 and 1.5 μm. The term "VDF quasipolymer" denotes the fraction of the PVDF not extracted by steeping the microtome section. This fraction, which constitutes the continuous crystalline phase of the PVDF, is composed essentially of VDF quasipolymer, that is to say of a VDF polymer the polymer chains of which are composed essentially of VDF.

The three methods thus described by way of illustration of processes for the preparation of a heterogeneous PVDF are distinguished from the process in which there is only one stage during which the VDF and the comonomer are injected all at once into the reactor. They are also distinguished from the single-stage processes in which the VDF and the comonomer are injected gradually while retaining a constant VDF/comonomer weight ratio.

Another method for the preparation of a heterogeneous PVDF consists in intimately blending a PVDF homopolymer powder and a homogeneous PVDF copolymer powder. It is also possible to blend an aqueous suspension or dispersion of a PVDF homopolymer and an aqueous suspension or dispersion of a homogeneous PVDF copolymer.

Advantageously, the heterogeneous PVDF has a viscosity ranging from 100 Pas to 10 000 Pas, preferably between 300 and 3000 Pas, the viscosity being measured at 230° C. at a shear gradient of 100 s$^{-1}$ using a capillary rheometer.

As regards the interfacial agent (B), this term denotes any product which, blended with (A) under the conditions cited above to form a masterbatch, improves the effectiveness of the masterbatch as processing aid. Mention may be made, as examples of interfacial agent (B), of:
a) silicones;
b) silicone-polyether copolymers;
c) aliphatic polyesters, such as polybutylene adipate, polylactic acid and polycaprolactones;
d) aromatic polyesters, such as, for example, the diisobutyl ester of phthalic acid;
e) polyethers, such as, for example, polyether polyols and polyalkylene oxides, such as, for example, defined in U.S. Pat. No. 4,855,360;
f) amine oxides, such as, for example, octyldimethylamine oxide;
g) carboxylic acids, such as, for example, hydroxybutanedioic acid;
h) fatty acid esters, such as sorbitan monolaurate.

Without being committed to any one interpretation, it is possible that the role of the interfacial agent (B) is to stabilize the fluoropolymer (A). It interacts physically and/or chemically with the fluoropolymer (A).

Advantageously (B) is a polyether, preferably chosen from oligomers or polymers having alkylene oxide (for example ethylene oxide or propylene oxide) units, or a polycaprolactone. Mention may be made, by way of example, of polyoxyethylene glycol, commonly referred to as polyethylene glycol (PEG). Advantageously, the number-average molecular weight $\overline{Mn}$ is between 400 and 15 000 g/mol (the latter can, for example, be determined using viscosity measurements) and the melting point is between 50 and 80° C. Mention may be made, as examples of PEG, of PLURIOL E® from BASF or POLYGLYCOL® from Clariant. It would not be departing from the scope of the invention to use a blend of two or more polyethers.

These PEGs and other examples of PEG are disclosed in U.S. Pat. No. 5,587,429 and U.S. Pat. No. 5,015,693. Mention may thus be made of:

- polyethylene glycol of formula $H(OC_2H_4)_n OH$, where n is an integer close to 76, between 70 and 80;
- $H(OC_2H_4)_d[OCH(CH_3)CH_2]_e(OC_2H_4)_f OH$, where d, e and f denote integers with d+f close to 108, between 100 and 110, and e close to 35, between 30 and 40;
- CARBOWAX® 3350, having a number-average molecular weight of approximately 3500 g/mol;
- CARBOWAX® 8000, having a number-average molecular weight of approximately 8000 g/mol;
- POLYGLYCOL® 8000 from Clariant, having a number-average molecular weight of between 7000 and 9000 g/mol.

The polycaprolactone preferably has a number-average weight of between 1000 and 32 000, preferably between 2000 and 10 000 and more preferably still between 2000 and 4000 g/mol.

As regards the thermoplastic resin (D), the latter can be a polyolefin, a styrene resin, a polyester or a PVC.

The polyolefin can, for example, be:

- a polyethylene, in particular a low-density polyethylene (LDPE), a high-density polyethylene (HDPE), a linear-low-density polyethylene (LLDPE) or ultra-high-density polyethylene (UHDPE). It can be a polyethylene obtained using a catalyst of the metallocene type or more generally a "single-site" catalyst, a catalyst of Phillips type or a catalyst of Ziegler-Natta type.
- a polypropylene, in particular an iso- or syndiotactic polypropylene;
- a biaxially-oriented polypropylene;
- a polybutene (obtained from 1-butene);
- a poly(3-methylbutene) or a poly(4-methylpentene).

It would not be departing from the scope of the invention in the case of the extrusion of a filler-comprising blend of two or more polyolefins, for example a blend of an LLDPE with an LDPE.

The masterbatch is particularly advantageous for polyethylenes of high molecular weight and/or exhibiting a narrow molecular weight distribution (typically such that the polydispersity index is less than 3, rather less than 2.5 and better still less than 2.2). It is particularly useful for the extrusion of a polyolefin, in particular a polyethylene, in the form of a film.

The term "styrene resin" denotes a homopolystyrene or a copolymer of styrene comprising at least 50 wt % of styrene. It can be a crystal polystyrene, a high-impact polystyrene, an acrylonitrile-butadiene-styrene (ABS) copolymer or a block copolymer, for example a copolymer comprising styrene and a diene.

The polyester can, for example, be polyethylene terephthalate (PET) or polybutylene terephthalate (PBT).

The thermoplastic resin can comprise a filler, that is to say can comprise dispersed organic or inorganic particles. The inorganic filler can be, for example, a silica, an alumina, a zeolite, a titanium oxide, a carbonate (for example, sodium carbonate or potassium carbonate), hydrotalcite, talc, a zinc oxide, a magnesium oxide or a calcium oxide, a diatomaceous earth, carbon black, and the like. It can also be an inorganic pigment. The organic particles can, for example, be those of an organic pigment or else of an antioxidant.

As regards the processing aid, the latter comprises, according to a 1st embodiment, at least one heterogeneous PVDF (A) and at least one interfacial agent (B) which are optionally diluted in a polyolefin (C). The respective proportions by weight of (A) and (B) can be such that (A)/(B) is between 10/90 and 90/10, preferably between 30/70 and 70/30 and better still between 40/60 and 60/40. According to a 2nd embodiment, the processing aid may be composed of heterogeneous PVDF used alone.

When (A) and (B) are diluted in a polyolefin (C) to give a masterbatch, the proportion by weight of (A) and (B) is from 1 to 30%, preferably from 1 to 10%, preferentially from 1.5 to 10%, more preferably still from 2 to 10%, per 70 to 99%, preferably 90 to 99%, preferentially 90 to 98.5%, more preferably still 90 to 98%, respectively of (C).

The processing aid is prepared by blending at least one heterogeneous PVDF (A) and at least one interfacial agent (B). This blend can subsequently be used as is or else can be diluted in a polyolefin (C) in the form of a masterbatch. The blend of (A) and of (B) or else the masterbatch is provided in the form of a powder or granules. The process for obtaining the processing aid thus comprises a stage of blending (A) and (B), followed by a stage of putting into the form of a powder or of granules, and optionally a stage of diluting the blend in a polyolefin, followed by a stage of putting into the form of a powder or of granules.

The stage of blending (A) and (B) is carried out using any mixing means suitable for thermoplastics. Use may be made, for example, of an extruder or a kneader. Use may also advantageously be made of the compacting technique. This consists in introducing (A) and (B), both in the form of powders, into a granulator and in then forcing the blend through a die. The operating principle of a granulator is represented diagrammatically in FIG. 3/3. This granulator comprises a rotating roller which compresses/blends the blend of (A) and (B) and then the blend is pressed into the compression channels of the perforated die so as to form a cylindrical granule which is subsequently cut up using a cutting device situated under the die. The friction generated during the blending of the powders in the granulator makes it possible to exceed the melting point of the interfacial agent (B).

Preferably, and surprisingly, good effectiveness is obtained when the blending is carried out so that the heterogeneous PVDF (A) is solid and the interfacial agent (B) is molten throughout its mass or at its surface. Preferably, the temperature at which the blending of (A) and of (B) is carried out is chosen so that (B) exhibits a viscosity which is not too low. The temperature is chose so that:

- the interfacial agent (B) is in the molten state throughout its mass or at its surface and
- the fluoropolymer (A) is in the solid state.

The interfacial agent is said to be molten throughout its mass when it is entirely liquid. It is said to be molten at its surface when the particles of interfacial agent are covered with a molten surface layer and are solid at their core. The compacting technique is well suited to this but it is possible also to use an extruder operating with carefully chosen and controlled zone temperatures.

The blending of (A) and (B) is preferably carried out at a temperature of between 10 and 120° C., advantageously between 20 and 100° C., preferably between 40 and 100° C., more preferably still between 60 and 100° C. By operating in this way, it has been found that the effectiveness is better than by operating at a temperature such that (A) and (B) are both in the molten state. A temperature of less than 120° C. makes it possible not to thermally decompose the interfacial agent (B), which might affect its effectiveness in the blend or result in yellowing. In order to promote intimate blending, it is preferable for the fluoropolymer (A) to be in the form of a powder, that is to say in the dispersed form.

Without being committed to any one theory, it is possible that the better effectiveness of the processing aid in comparison with other solutions is related to the fact that (A) and (B) interact physically and/or chemically during the blending stage. To operate in this way is more effective than, for example, to add, to the thermoplastic resin, a masterbatch of (A) and a masterbatch of (B), for which there is not such good contact between (A) and (B) before the contact with the thermoplastic resin. Operating in this way is also more effective than the method consisting in introducing (A) and (B) separately.

The diluting in the polyolefin (C) can be carried out in any device for blending plastics known to a person skilled in the art. It can, for example, be an extruder or a kneader. Preferably, it is an extruder.

Advantageously, when the thermoplastic resin is a polyolefin, a polyolefin (C) of the same nature is chosen, that is to say that, for example, two polyethylenes or two polypropylenes, preferably having similar viscosities, are concerned.

It would not be departing from the scope of the invention if additives of UV absorber or antioxidant type were added to the processing aid.

BEST MODE

One particularly effective processing aid is that which combines the preferred heterogeneous PVDF, which is the VDF/HFP copolymer comprising 88 to 92 wt % of VDF and 8 to 12 wt % of HFP that has an MP between 160 and 172° C., such as for example PVDF-1 (see the examples section) and a PEG or a polycaprolactone.

[Use]

The processing aid is used to reduce or eliminate the surface defects which appear during the extrusion of the thermoplastic resin. It significantly reduces the time making it possible to obtain stable and defect-free extrusion within a range of extrusion parameters which normally exhibits significant extrusion instabilities. Since it is more effective than other processing aids already available commercially, the processing aid of the invention makes it possible to reduce the amount to be added to the thermoplastic resin. This makes it possible:

to reduce the costs associated with the extrusion;
to reduce the problems of coloring and/or of smell related to the decomposition of the interfacial agent; and
to reduce the risks of chemical interactions between the interfacial agent and/or the fluoropolymer and the possible other additives of the thermoplastic resin, in particular antioxidants.

The processing aid and the thermoplastic resin are brought into contact in the solid state before the extrusion. They can be preblended in the solid state or simply introduced into the hopper of the extruder. The processing aid can also be introduced in the molten state at any point of the extruder which is used to extrude the thermoplastic resin, for example using a side extruder.

The processing aid is particularly useful for the extrusion of a thermoplastic resin in the form of a film or else in the form of a pipe, of a profile, of a hollow body, and the like. In addition to the advantages already mentioned, it facilitates the production of a smooth and defect-free surface, which is particularly important in the case of a film in order to obtain good optical properties. The processing aid also makes it possible to reduce the pressure at the nip of the die and the level of gels. It also makes it possible, to a certain extent, to reduce the deposits at the die outlet.

The processing aid is used in the form of granules or in the form of a powder.

The proportion of masterbatch to be introduced into the thermoplastic resin is advantageously such that the amount of (A)+(B) with respect to the thermoplastic resin is of the order of 100 ppm to 100 000 ppm, advantageously from 1000 to 80 000 ppm, preferably from 1000 to 10 000 ppm.

EXAMPLES

Products Used

The following products were used:
INNOVEX® LL0209AA denotes a linear-low-density polyethylene with an MFI of 0.9 g/10 min (190° C., 2.16 kg) sold by Innovene (previously sold by BP Chemicals).
LACQTENE® 1003FE23 denotes a low density polyethylene with an MFI of 0.3 g/10 min (190° C., 2.16 kg) sold by Total Petrochemicals (previously by Atofina).
PVDF-1: heterogeneous PVDF prepared according to Example 3 illustrating the 2nd method. This is a VDF-HFP heterogeneous PVDF (10 wt % of HFP) with a melting point of 166° C. and a viscosity of 2350 Pa·s (230° C., 100 s$^{-1}$).
PVDF-2: VDF-HFP homogeneous PVDF (11 wt % of HFP) with an MVI of 1.5 cm$^3$/10 minutes (230° C., 5 kg), a melting point of 140-145° C. and a viscosity of 1600 Pa·s (230° C., 100 s$^{-1}$).
PLURIOL E 9000P: PEG sold by BASF with a molecular weight of 9000 g/mol.
Masterbatch MB-1
5% of PVDF-2 is incorporated by single-screw extrusion in LL0209AA. The masterbatch thus obtained is recorded as MB-1 (it thus comprises overall, by weight, 95% of LL0209AA and 5% of PVDF-2).
Masterbatch MB-2
5% of PVDF-1 is incorporated by single-screw extrusion in LL0209AA. The masterbatch thus obtained is recorded as MB-2 (it thus comprises overall, by weight, 95% of LL0209AA and 5% of PVDF-1).
Masterbatch MB-3
A dry blend comprising, by weight, 60% of PVDF-2 and 40% of PLURIOL E 9000P is prepared. This blend is subsequently incorporated by single-screw extrusion at a level of 5 wt % in LL0209AA. The masterbatch thus obtained is recorded as MB-3 (it thus comprises overall: 95% of LL0209AA, 3% of PVDF-2 and 2% of PEG).
Masterbatch MB-4
A dry blend comprising, by weight, 60% of PVDF-1 and 40% of PLURIOL E 9000P is prepared. This blend is subsequently incorporated by single-screw extrusion at a level of 5 wt % in LL0209AA. The masterbatch thus obtained is recorded as MB-4 (it thus comprises overall: 95% of LL0209AA, 3% of PVDF-1 and 2% of PEG).

In the following examples, all the film extrusion tests were carried out at 8 kg/hour. In the examples below, the polymer which acts as base in this study is a blend of 70 wt % of INNOVEX LL0209AA polyethylene and of 30% of LAC-QTENE 1003FE23 polyethylene. This blend is referred to as (Pol) blend.

Example 1

Extrusion at 190° C. of the (Pol) blend on a sheathing extrusion-blow molding line from Collin with a screw diameter of 30 mm, of L/D=25, with a die with a diameter of 50.5 mm and with a nip of 0.8 mm. During this extrusion, the melt fracture defect appears instantaneously. After extruding for 120 minutes, the defect persists over the whole of the film produced and then the experiment is halted.

Examples 2 to 5

The same test conditions are repeated with the masterbatches MB-1 to MB-4 (see the graph in FIG. 3/3).

TABLE I

| Examples | | Time to achieve 0% defect (min) |
| --- | --- | --- |
| No additive | | defect persisting even after extruding for 120 min |
| MB-1 (comp.) | homogeneous PVDF | 90 |
| MB-2 (inv.) | heterogeneous PVDF | 55 |
| MB-3 (comp.) | homogeneous PVDF + PEG | 70 |
| MB-4 (inv.) | heterogeneous PVDF + PEG | 45 |

From the results obtained, it is found that the masterbatches can be classified by decreasing effectiveness in the order:
MB-1<MB-2<MB-3<MB-4

The heterogeneous PVDF (PVDF-1) is more effective than a homogeneous PVDF. Furthermore, the masterbatch comprising both a heterogeneous PVDF and a PEG is the most effective of all.

The invention claimed is:

1. A processing aid comprising:
at least one heterogeneous PVDF (A), that is a copolymer of VDF and of at least one comonomer of VDF comprising at least 50 of VDF which has a melting point MP (expressed in ° C.)>172-549 m, where m denotes the overall molar percentage of comonomer(s); and
at least one interfacial agent (B), wherein (B) is selected from the group consisting of:
 a) silicones;
 b) silicone-polyether copolymers;
 c) aliphatic polyesters, such as polybutylene adipate, polylactic acid and polycaprolactones;
 d) aromatic polyesters such as the diisobutyl ester of phthalic acid;
 e) polyethers such as polyether polyols and polyalkylene oxides;
 f) amine oxides such as octyldimethylamine oxide;
 g) carboxylic acids such as hydroxybutanedioic acid; and
 h) fatty acid esters such as sorbitan monolaurate;
optionally diluted in a polyolefin (C).

2. The processing aid as claimed in claim 1, in which the heterogeneous PVDF (A) has an MP (expressed in ° C.) between (172-340 m) and 172° C., where m denotes the overall molar percentage of comonomer(s).

3. The processing aid as claimed in claim 1 in which the heterogeneous PVDF comprises from 0.1 to 25%, of at least one comonomer per 75 to 99.9%, respectively of VDF.

4. The processing aid as claimed in claim 1 characterized in that the comonomer is chosen from vinyl fluoride, trifluoroethylene (VF3), chlorotrifluoroethylene (CTFE), 1,2-difluoroethylene, tetrafluoroethylene (TFE), hexafluoropropylene (HFP) and perfluoro(alkyl vinyl)ethers.

5. The processing aid as claimed in claim 1, in which the MP is between 160 and 172° C.

6. The processing aid as claimed in claim 5, in which the heterogeneous PVDF (A) is a VDF-HFP copolymer comprising from 88 to 92 wt % of VDF and from 8 to 12 wt % of HFP.

7. The processing aid as claimed in claim 1 in which the interfacial agent (B) is chosen from oligomers or polymers having alkylene oxide units or a polycaprolactone.

8. The processing aid as claimed in claim 1 in which the interfacial agent (B) is chosen from polyethylene glycol of formula $H(OC_2H_4)_nOH$ where n is an integer between 70 and 80 or of formula $H(OC_2H_4)_d[OCH(CH_3)CH_2]_e(OC_2H_4)_fOH$ where d, e and f denote integers with d+f between 100 and 110, and e between 30 and 40.

9. The processing aid as claimed in claim 1 in which the interfacial agent (B) is a polyethylene glycol (PEG).

10. The processing aid as claimed in claim 9, in which the PEG has a number-average molecular weight $\overline{Mn}$ between 400 and 15 000 g/mol.

11. The processing aid as claimed in claim 9 in which the PEG has a melting point between 50 and 80° C.

12. A process for reducing or eliminating the surface defects which appear during extrusion of a thermoplastic resin (D), comprising admixing said processing aid of claim 1 with a thermoplastic resin prior to extrusion.

13. The process as claimed in claim 12, in which the thermoplastic resin (D) is a polyolefin, a styrene resin, a polyester or a PVC.

14. The process as claimed in claim 12 in which the thermoplastic resin (D) contains dispersed organic or mineral particles.

15. The processing aid of claim 1, wherein said at least one heterogeneous PVDF (A), comprises at least 75 wt % of VDF.

16. The processing aid of claim 1 wherein said heterogeneous PVDF (A) has a melting point MP (expressed in ° C.)>1.1×(172-549 m).

17. The processing aid of claim 1, wherein said aliphatic polyesters are selected from the group consisting of polybutylene adipate, polylactic acid and polycaprolactones; said aromatic polyester is the diisobutyl ester of phthalic acid; said polyethers are selected from the group consisting of polyether polyols and polyalkylene oxides; said amine oxide is octyldimethylamine oxide; said carboxylic acid is hydroxybutanedioic acid; and said fatty acid ester is sorbitan monolaurate.

* * * * *